US010009925B2

(12) United States Patent
Vajapeyam et al.

(10) Patent No.: US 10,009,925 B2
(45) Date of Patent: Jun. 26, 2018

(54) PHYSICAL LAYER PROCEDURES FOR LTE IN UNLICENSED SPECTRUM

(71) Applicant: QUALCOMM Incorporated, San Diego, CA (US)

(72) Inventors: Madhavan Srinivasan Vajapeyam, San Diego, CA (US); Aleksandar Damnjanovic, Del Mar, CA (US); Tao Luo, San Diego, CA (US); Yongbin Wei, La Jolla, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 26 days.

(21) Appl. No.: 14/873,079

(22) Filed: Oct. 1, 2015

(65) Prior Publication Data
US 2016/0100433 A1  Apr. 7, 2016

Related U.S. Application Data

(60) Provisional application No. 62/059,670, filed on Oct. 3, 2014.

(51) Int. Cl.
*H04W 4/00* (2018.01)
*H04W 74/08* (2009.01)
(Continued)

(52) U.S. Cl.
CPC ...... *H04W 74/0816* (2013.01); *H04B 17/318* (2015.01); *H04B 17/327* (2015.01);
(Continued)

(58) Field of Classification Search
CPC ..... H04W 16/12; H04W 16/14; H04W 24/10; H04W 28/0268; H04W 52/42;
(Continued)

(56) References Cited

U.S. PATENT DOCUMENTS 9,629,016 B2 * 4/2017 Xin .................. H04W 24/10
9,642,101 B2 * 5/2017 Xiao ................ H04W 52/42
(Continued)

FOREIGN PATENT DOCUMENTS

WO  WO-2012/140314 A1  10/2012
WO  WO-2013/006988 A1   1/2013
WO  WO-2013/141544 A1   9/2013

OTHER PUBLICATIONS

Huawei et al., "Potential Solutions for LAA-LTE Design", 3GPP Draft; R1-143726, 3rd Generation Partnership Project (3GPP), Mobile Competence Centre, 650, Route Des Lucioles, F-06921 Sophia-Antipolis Cedex, France vol. RAN WG1, No. Ljubljana, Slovenia; Oct. 6, 2014-Oct. 10, 2014, Sep. 27, 2014 (Sep. 27, 2014), XP050869412, Retrieved from the Internet: URL: http://www.3gpp.org/ftp/tsg_ran/WG1_RL1/TSGR1_78b/Docs/ [retrieved on Sep. 27, 2014].

(Continued)

*Primary Examiner* — Harun Chowdhury
(74) *Attorney, Agent, or Firm* — Arent Fox, LLP

(57) ABSTRACT

The disclosure provides for control plane measurements in a wireless device. The wireless device may perform, on signals received over an unlicensed spectrum across multiple sub-frames, radio resource management (RRM) measurements of a cell. The wireless device may identify one or both of a first subset of the RRM measurements associated with a first subset of the sub-frames including opportunistic transmissions and a second subset of the RRM measurements associated with a second subset of the sub-frames including guaranteed transmissions. The wireless device may determine one or more RRM measurement values based on one or both of the first subset of the RRM measurements and the second subset of the RRM measurements. The wireless device may similarly perform radio link management (RLM) measurements and determine RLM (Continued)

measurement values based on the first and second subsets. The wireless device may also use timers for uplink transmissions to detect radio link failures.

16 Claims, 7 Drawing Sheets

(51) Int. Cl.
| | |
|---|---|
| *H04B 17/318* | (2015.01) |
| *H04B 17/336* | (2015.01) |
| *H04W 16/14* | (2009.01) |
| *H04W 56/00* | (2009.01) |
| *H04L 5/00* | (2006.01) |
| *H04B 17/327* | (2015.01) |

(52) U.S. Cl.
CPC ............ *H04B 17/336* (2015.01); *H04L 5/00* (2013.01); *H04W 16/14* (2013.01); *H04W 56/0095* (2013.01)

(58) Field of Classification Search
CPC ........... H04W 72/085; H04W 72/0453; H04W 72/1215; H04W 56/0095; H04W 74/0816; H04B 17/318; H04B 17/327; H04B 17/336; H04L 5/00
USPC .................. 370/252, 329, 350, 331; 455/454
See application file for complete search history.

(56) References Cited

U.S. PATENT DOCUMENTS

| | | |
|---|---|---|
| 2009/0190480 A1 | 7/2009 | Sammour et al. |
| 2013/0153298 A1 | 6/2013 | Pietraski et al. |
| 2014/0036818 A1 | 2/2014 | Koskela et al. |
| 2014/0161074 A1 | 6/2014 | Somasundaram et al. |
| 2014/0211655 A1 | 7/2014 | Yoo et al. |
| 2014/0254524 A1 | 9/2014 | Cheng et al. |
| 2016/0066195 A1* | 3/2016 | Moon .................... H04W 16/14 455/454 |
| 2017/0041803 A1* | 2/2017 | Shi ....................... H04W 72/085 |
| 2017/0086214 A1* | 3/2017 | Kalhan ............. H04W 72/1215 |

OTHER PUBLICATIONS

International Search Report and Written Opinion—PCT/US2015/053844 ISA/EPO—dated Apr. 21, 2016. 34 Total Pages.
Pantech, "Analysis of the RLF in Dual Connectivity", 3GPP Draft, R2-131100, 3rd Generation Partnership Project (3GPP), Mobile Competence Centre, 650, Route Des Lucioles, F-06921 Sophia-Antipolis Cedex; France vol. RAN WG2, No. Chicago, USA, Apr. 15, 2013-Apr. 19, 2013 Apr. 6, 2013 (Apr. 6, 2013), XP050699421, Retrieved from the Internet: URL: http://www.3gpp.org/ftp/tsg_ran/WG2 RL2/TSGR2_81bis/Docs/ [retrieved on Apr. 6, 2013].

* cited by examiner

PHYSICAL LAYER PROCEDURES FOR LTE IN UNLICENSED SPECTRUM

CROSS-REFERENCE TO RELATED CASES

The present Application for Patent claims priority to U.S. Provisional Application No. 62/059,670, entitled "PHYSICAL LAYER PROCEDURES FOR LTE IN UNLICENSED SPECTRUM" filed Oct. 3, 2014, and assigned to the assignee hereof and hereby expressly incorporated by reference herein.

BACKGROUND

Aspects of the present disclosure relate generally to wireless communications, and more particularly, to physical layer procedures at a wireless device.

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the UMTS mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

A wireless communication network may include a number of eNodeBs that can support communication for a number of user equipments (UEs). A UE may communicate with an eNodeB via the downlink and uplink. The downlink (or forward link) refers to the communication link from the eNodeB to the UE, and the uplink (or reverse link) refers to the communication link from the UE to the eNodeB.

Operation of wireless devices in certain portions of a shared or unlicensed spectrum may experience interference from another radio access technology (RAT) using the spectrum. For example, both LTE and Wi-Fi may operate in an unlicensed 5 GHz band. Over-the-air interference detection is employed in some wireless communication networks in an attempt to mitigate such interference. For example, a device may periodically monitor (e.g., sniff) for energy in the RF band used by the device. Upon detection of any kind of energy, the device may back-off the RF band for a period of time. Such process may be referred to as clear channel assessment (CCA).

In practice, however, there may be problems with such a back-off or "listen-before-talk" (LBT) approach. Some transmissions may be delayed or may not occur due to CCA procedures. For example, an eNodeB may not transmit various reference signals in the downlink due to CCA procedures. A UE may be unable to correctly measure the downlink channel of an eNodeB when reference signals are missing. Missing or inaccurate measurements may cause further problems for radio resource monitoring, radio link monitoring, and radio link failure detection. In view of the foregoing, it may be understood that there may be significant problems and shortcomings associated with operation of wireless devices in shared and unlicensed spectrum.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The disclosure provides for performing control plane measurements in a wireless device. The wireless device may per, signals across multiple sub-frames received over an unlicensed spectrum, received signals from a cell to obtain measurements. The wireless device may identify one or both of a first subset of the measurements associated with a first subset of the sub-frames including opportunistic transmissions and a second subset of the measurements associated with a second subset of the sub-frames including guaranteed transmissions. The wireless device may also determine one or more measurement values based on one or both of the first subset of the RRM measurements and the second subset of the measurements. The wireless device may determine radio resource management measurement values or radio link management measurement values. The wireless device may also use timers for uplink transmissions to detect radio link failures.

In an aspect, the disclosure provides a method for performing control plane measurements in a wireless device. The method may include performing, on signals received over an unlicensed spectrum across multiple sub-frames, radio resource management (RRM) measurements of a cell. The method may further include identifying one or both of a first subset of the RRM measurements associated with a first subset of the sub-frames including opportunistic transmissions and a second subset of the RRM measurements associated with a second subset of the sub-frames including guaranteed transmissions. The method may also include determining one or more RRM measurement values based on one or both of the first subset of the RRM measurements and the second subset of the RRM measurements. In another aspect, the disclosure provides a method for control plane measurements in a wireless device. The method may include measuring, across multiple sub-frames received over an unlicensed spectrum, received cell-specific reference signals (CRS). The method may further include identifying a first subset of the CRS measurements associated with a first subset of the sub-frames including opportunistic transmissions and a second subset of the CRS measurements associated with a second subset of the sub-frames including guaranteed transmissions. The method may also include computing one or both of a first signal to interference plus noise ratio (SINR) value for the first subset of CRS measurements and a second SINR value for the second subset of CRS measurements. The method may also include monitoring a radio link condition of the wireless device based at least in part on the first SINR value computed for the first subset of CRS measurements or the second SINR value computed for the second subset of CRS measurements.

In another aspect, the disclosure provides a method for detecting a radio link failure (RLF) in a wireless device. The method may include triggering an uplink transmission procedure at a transmission time. The method may also include starting a timer at the transmission time. The method may further include performing one or more clear channel assessments to access a transmission medium over an unlicensed spectrum for the uplink transmission before initiating the uplink transmission. The method may also include identifying an RLF for the wireless device when the timer expires before transmitting the uplink transmission.

In another aspect, the disclosure provides another method for detecting an RLF in a wireless device. The method may include generating a radio link control (RLC) protocol data unit (PDU). The method may further include starting a timer when first transmitting the RLC PDU over an unlicensed spectrum. The method may also include identifying an RLF when the timer expires before receiving an acknowledgment for the RLC PDU or when a maximum number of RLC retransmissions occur for the RLC PDU.

In another aspect, the disclosure provides an apparatus for performing control plane measurements in a wireless device. The apparatus may include a transceiver configured to receive signals over an unlicensed spectrum across multiple sub-frames. The apparatus may further include a memory and a processor communicatively coupled to the transceiver and the memory. The processor and memory may be configured to perform, on the signals received over the unlicensed spectrum across the multiple sub-frames, RRM measurements of a cell. The processor and memory may be further configured to identify one or both of a first subset of the RRM measurements associated with a first subset of the sub-frames including opportunistic transmissions and a second subset of the RRM measurements associated with a second subset of the sub-frames including guaranteed transmissions. The processor and memory may be further configured to determine one or more RRM measurement values based on one or both of the first subset of the RRM measurements and the second subset of the RRM measurements.

In another aspect, the disclosure provides another apparatus for control plane measurements in a wireless device. The apparatus may include a transceiver configured to receive signals over an unlicensed spectrum across multiple sub-frames. The apparatus may further include a memory and a processor communicatively coupled to the transceiver and the memory. The processor and memory may be configured to measure, across the multiple sub-frames received over the unlicensed spectrum, received CRS from the cell. The processor and memory may also be configured to identify one or both of a first subset of the CRS measurements associated with a first subset of the sub-frames including opportunistic transmissions and a second subset of the CRS measurements associated with a second subset of the sub-frames including guaranteed transmissions. The processor and memory may also be configured to compute one or both of a first SINR value for the first subset of the CRS measurements and a second SINR value for the second subset of the CRS measurements. The processor and memory may also be configured to monitor a radio link condition of the wireless device based at least in part on the first SINR value computed for the first subset of CRS measurements or the second SINR value computed for the second subset of CRS measurements.

In another aspect, the disclosure provides another apparatus for performing control plane measurements in a wireless device. The apparatus may include means for performing, on signals received over an unlicensed spectrum across multiple sub-frames, RRM measurements of a cell. The apparatus may further include means for identifying one or both of a first subset of the RRM measurements associated with a first subset of the sub-frames including opportunistic transmissions and a second subset of the RRM measurements associated with a second subset of the sub-frames including guaranteed transmissions. The apparatus may also include means for determining one or more RRM measurement values based on one or both of the first subset of the RRM measurements and the second subset of the RRM measurements.

In another aspect, the disclosure provides another apparatus for control plane measurements in a wireless device. The apparatus may include means for measuring, across multiple sub-frames received over an unlicensed spectrum, a received CRS from a cell to obtain CRS measurements. The apparatus may further include means for identifying one or both of a first subset of the CRS measurements associated with a first subset of the sub-frames including opportunistic transmissions and a second subset of the CRS measurements associated with a second subset of the sub-frames including guaranteed transmissions. The apparatus may also include means for computing one or both of a first SINR value for the first subset of the CRS measurements and a second SINR value for the second subset of the CRS measurements. The apparatus may additionally include means for monitoring a radio link condition of the wireless device based at least in part on a first SINR value computed for the first subset of CRS measurements or a second SINR value computed for the second subset of CRS measurements.

In another aspect, the disclosure provides a computer-readable medium storing computer executable code for performing control plane measurements in a wireless device. The computer-readable medium may include code for performing, on signals received over an unlicensed spectrum across multiple sub-frames, RRM measurements of a cell. The computer-readable medium may also include code for identifying one or both of a first subset of the RRM measurements associated with a first subset of the sub-frames including opportunistic transmissions and a second subset of the RRM measurements associated with a second subset of the sub-frames including guaranteed transmissions. The computer-readable medium may further include code for determining one or more RRM measurement values based on one or both of the first subset of the RRM measurements and the second subset of the RRM measurements.

In another aspect, the disclosure provides a computer-readable medium storing computer executable code for control plane measurements in a wireless device. The computer-readable medium may include code for measuring, across multiple sub-frames received over an unlicensed spectrum, a received CRS from a cell to obtain CRS measurements. The computer-readable medium may further include code for identifying one or both of a first subset of the CRS measurements associated with a first subset of the sub-frames including opportunistic transmissions and a second subset of the CRS measurements associated with a second subset of the sub-frames including guaranteed transmissions. The computer-readable medium may also include code for computing one or both of a first SINR value for one or both of the first subset of CRS measurements and a second SINR value for the second subset of the CRS measurements. The computer-readable medium may additionally include code for monitoring a radio link condition of the wireless device based at least in part on a first SINR value computed for the first subset of CRS measurements or a second SINR value computed for the second subset of CRS measurements.

In another aspect, the disclosure provides an apparatus for detecting an RLF in a wireless device. The apparatus may include a transceiver configured to receive and transmit signals over an unlicensed spectrum. The apparatus may also include a memory and a processor communicatively coupled to the transceiver and the memory. The processor and memory may be configured to trigger an uplink transmission procedure via the transceiver at a transmission time. The processor and memory may also be configured to start a timer at the transmission time. The memory and the processor may also be configured to perform, via the transceiver, one or more clear channel assessments to access a transmission medium over the unlicensed spectrum for the uplink transmission before initiating the uplink transmission. The processor and memory may also be configured to identify an RLF for the wireless device when the timer expires before transmitting the uplink transmission.

In another aspect, the disclosure provides an apparatus for detecting an RLF in a wireless device. The apparatus may include means for triggering an uplink transmission procedure at a transmission time. The apparatus may also include means for starting a timer at the transmission time. The apparatus may further include means for performing one or more clear channel assessments to access a transmission medium over an unlicensed spectrum for the uplink transmission before initiating the uplink transmission. The apparatus may additionally include means for identifying an RLF for the wireless device when the timer expires before transmitting the uplink transmission.

In another aspect, the disclosure provides a computer-readable medium storing computer executable code for detecting a RLF in a wireless device. The computer-readable medium may include code for triggering an uplink transmission procedure at a transmission time. The computer-readable medium may also include code for starting a timer at the transmission time. The computer-readable medium may further include code for performing one or more clear channel assessments to access a transmission medium over an unlicensed spectrum for the uplink transmission before initiating the uplink transmission. The computer-readable medium may additionally include code for identifying an RLF for the wireless device when the timer expires before transmitting the uplink transmission.

In another aspect, the disclosure provides an apparatus for detecting RLF in a wireless device. The apparatus may include a transceiver configured to transmit and receive signals over an unlicensed spectrum. the apparatus may further include a memory and a processor communicatively coupled to the transceiver and the memory. The processor and memory may be configured to generate a RLC PDU. The processor and memory may be configured to start a timer when first transmitting the RLC PDU over the unlicensed spectrum. The processor and memory may be configured to identify an RLF when the timer expires before receiving an acknowledgment for the RLC PDU or when a maximum number of RLC retransmissions occur for the RLC PDU.

In another aspect, the disclosure provides an apparatus for detecting an RLF in a wireless device. The apparatus may include means for generating a RLC PDU. The apparatus may further include means for starting a timer when first transmitting the RLC PDU over an unlicensed spectrum. The apparatus may also include means for identifying an RLF when the timer expires before receiving an acknowledgment for the RLC PDU or when a maximum number of RLC retransmissions occur for the RLC PDU.

A computer-readable medium storing computer executable code for detecting a RLF in a wireless device. The computer-readable medium may include code for generating a RLC PDU. The computer-readable medium may further include code for starting a timer when first transmitting the RLC PDU over an unlicensed spectrum. The computer-readable medium may also include code for identifying an RLF when the timer expires before receiving an acknowledgment for the RLC PDU or when a maximum number of RLC retransmissions occur for the RLC PDU.

Various aspects and features of the disclosure are described in further detail below with reference to various examples thereof as shown in the accompanying drawings. While the present disclosure is described below with reference to various examples, it should be understood that the present disclosure is not limited thereto. Those of ordinary skill in the art having access to the teachings herein will recognize additional implementations, modifications, and examples, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals, and where dashed lines may indicate optional components or actions. These drawings should not be construed as limiting the present disclosure, but are intended to be illustrative only.

DETAILED DESCRIPTION

Figure 1:
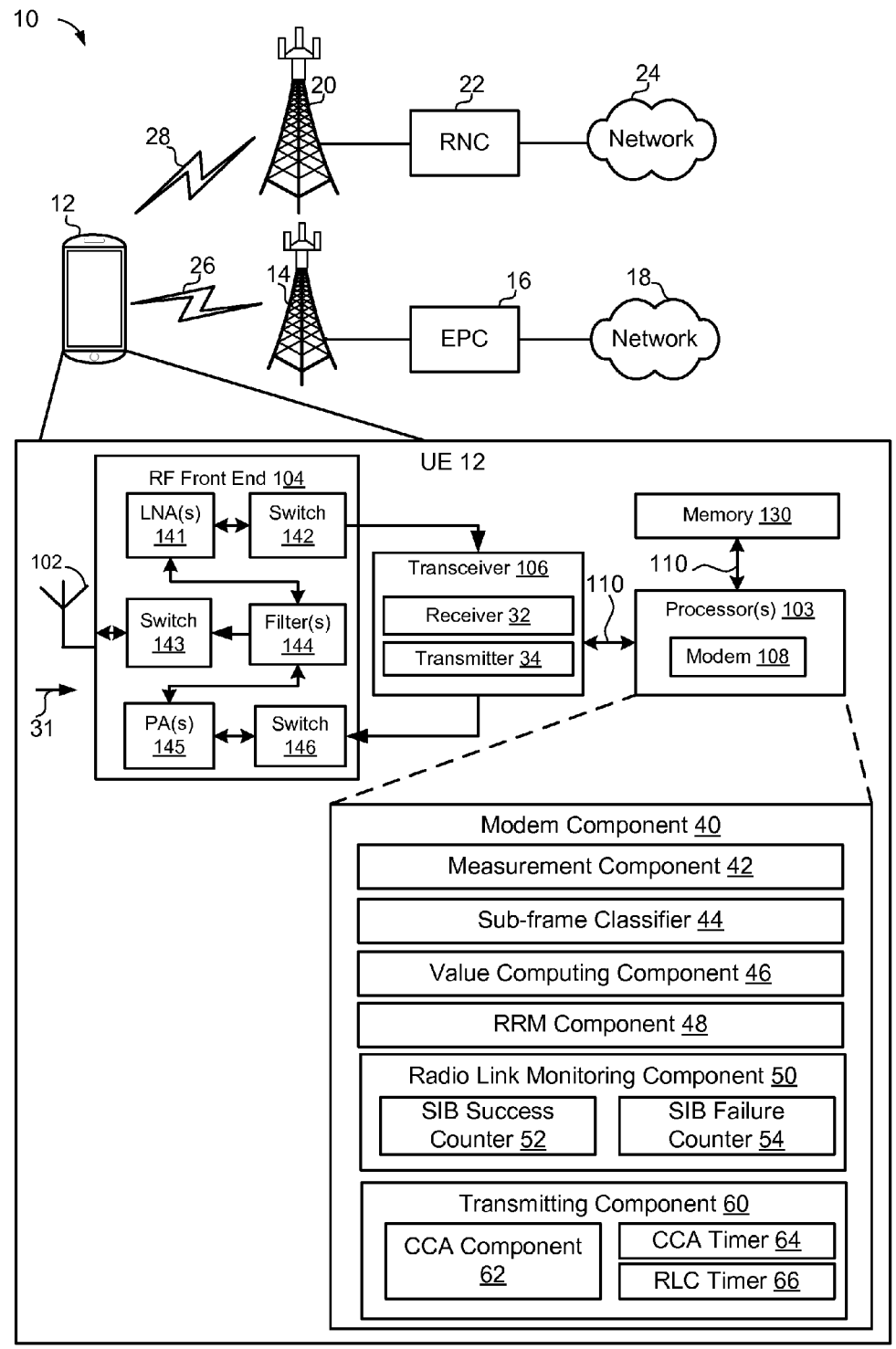
FIG. 1 is a block diagram conceptually illustrating an example of a telecommunications system in accordance with an aspect of the present disclosure.

The disclosure relates in some aspects to measurements and monitoring performed by a user equipment (UE) operating in unlicensed spectrum. The UE may perform measurements based on two types of downlink transmissions. A first type of downlink transmission may be an opportunistic transmission. As used herein, an "opportunistic transmission" may refer to a transmission that may occur when a carrier or channel meets certain conditions (e.g., the carrier or channel is not being used). In an aspect, for example, an opportunistic transmission may be subject to a CCA procedure or an extended CCA (E-CCA) procedure before transmission. A second type of downlink transmission may be a guaranteed transmission. As used herein, a "guaranteed transmission" may refer to a transmission that is guaranteed to happen at a certain time. For example, a guaranteed transmission may be received from an eNodeB in certain sub-frames. In an aspect, an eNodeB may designate certain sub-frames for downlink clear channel assessment (CCA) exempt transmissions (D-CET). During D-CET sub-frames, an eNodeB may transmit without performing LBT or CCA procedures. Accordingly, an eNodeB may use D-CET sub-frames to guarantee transmissions. In an aspect, guaranteed transmissions may be limited to a certain percentage of sub-frames or may require a minimum spacing between sub-frames. Accordingly, in an aspect, opportunistic transmissions may be used for a majority of transmissions of user data, while guaranteed transmissions may be used for signaling. In an aspect, sub-frames including guaranteed transmissions may experience different transmission conditions than sub-frames including opportunistic transmissions. For example, sub-frames including guaranteed transmissions may generally experience higher interference because the channel may not be clear.

In an aspect, a UE may perform different measurements based on sub-frames including opportunistic transmissions and sub-frames including guaranteed transmissions, or both. For example, radio resource monitoring measurements may include a reference signal received power (RSRP), a received signal strength indicator (RSSI), and a reference signal received quality (RSRQ). In an aspect, the RSRP may be filtered over sub-frames including either opportunistic transmissions or guaranteed transmissions. In an aspect, the UE may calculate separate RSSI values and RSRQ values for a first set of sub-frames including opportunistic transmissions and a second subset of sub-frames including guaranteed transmissions. The UE may also calculate radio link monitoring (RLM) measurement values such as a signal to interference plus noise ratio (SINR) separately for the first subset of sub-frames and the second subset of the sub-frames.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

For convenience, the use, operation, extension, and/or adaptation of LTE and/or LTE Advanced for applications in an unlicensed radio frequency (RF) band may be referred to herein as "LTE/LTE Advanced in unlicensed spectrum," "adapting LTE/LTE Advanced in unlicensed spectrum," "extending LTE/LTE Advanced to unlicensed spectrum," and "LTE/LTE Advanced communications over unlicensed spectrum" etc. Moreover, a network or device that provides, adapts, or extends LTE/LTE Advanced in unlicensed spectrum may refer to a network or device that is configured to operate in a contention-based radio frequency band or spectrum.

In some systems, LTE in unlicensed spectrum may be employed in a standalone configuration, with all carriers operating exclusively in an unlicensed portion of the wireless spectrum (e.g., LTE Standalone). In other systems, LTE in unlicensed spectrum may be employed in a manner that is supplemental to licensed band operation by providing one or more unlicensed carriers operating in the unlicensed portion of the wireless spectrum in conjunction with an anchor licensed carrier operating in the licensed portion of the wireless spectrum (e.g., LTE Supplemental DownLink (SDL)). In either case, carrier aggregation may be employed to manage the different component carriers, with one carrier serving as the Primary Cell (PCell) for the corresponding user equipment (UE) (e.g., an anchor licensed carrier in LTE SDL or a designated one of the unlicensed carriers in LTE Standalone) and the remaining carriers serving as respective Secondary Cells (SCells). In this way, the PCell may provide an FDD paired downlink and uplink (licensed or unlicensed), and each SCell may provide additional downlink capacity as desired.

In general, LTE utilizes orthogonal frequency division multiplexing (OFDM) on the downlink and single-carrier frequency division multiplexing (SC-FDM) on the uplink. In an aspect, either OFDM or SC-FDM may be utilized on the uplink on a per sub-frame basis. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal Fast Fourier Transform (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

LTE may also use carrier aggregation. UEs (e.g., LTE-Advanced enabled UEs) may use spectrum of up to 20 MHz bandwidths allocated in a carrier aggregation of up to a total of 100 MHz (5 component carriers) used for transmission and reception. For the LTE-Advanced enabled wireless communication systems, two types of carrier aggregation (CA) methods have been proposed, continuous CA and non-continuous CA. Continuous CA occurs when multiple available component carriers are adjacent to each other. On the other hand, non-continuous CA occurs when multiple non-adjacent available component carriers are separated along the frequency band. Both non-continuous and continuous CA may aggregate multiple component carriers to serve a single unit of LTE-Advanced UEs.

Referring to FIG. 1, in an aspect, a wireless communications system 10 includes at least one UE 12 in communication coverage of at least one eNodeB 14. UE 12 may communicate with a first radio access technology (RAT) network (e.g., an LTE network) such as network 18 including an evolved packet core (EPC) 16 via eNodeB 14. Multiple UEs 12 may be dispersed throughout the wireless communications system 10, and each UE 12 may be stationary or mobile. A UE 12 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 12 may be a cellular phone, a personal digital assistant (PDA), a wireless modem, a wireless communication device, a hand-held device, a tablet computer, a laptop computer, a cordless phone, a wireless local loop (WLL) station, a global positioning system (GPS) device, a multimedia device, a video device, a digital audio player (e.g., MP3 player), a camera, a game console, a wearable computing device (e.g., a smart-watch, smart-glasses, a health or fitness tracker, etc), an appliance, a sensor, a vehicle communication system, a medical device, a vending machine, a device for the Internet-of-Things, or any other similar functioning device. A UE 12 may be able to communicate with macro eNodeBs, pico eNodeBs, femto eNodeBs, relays, and the like.

An eNodeB 14 may provide a cell serving the UE 12. In some aspects, multiple UEs such as UE 12 may be in communication coverage with one or more eNodeBs, including eNodeB 14. An eNodeB 14 may be a station that communicates with the UE 12 and may also be referred to as a base station, an access point, a NodeB, etc. Each eNodeB, such as eNodeB 14 may provide communication coverage for a particular geographic area. In 3GPP, the term "cell" can refer to a coverage area of an eNodeB 14 and/or an eNodeB subsystem serving the coverage area, depending on the context in which the term is used. For example, the eNodeB 14 may be the cell where the UE 12 initially performs a connection establishment procedure. Such a cell may be referred to as a primary cell or Pcell. Another eNodeB (not shown) may be operating on another frequency and may be referred to as a secondary cell. It should be apparent that an eNodeB may operate as either a primary cell or a secondary cell depending on the connection state of the UE 12. A cell ID such as a primary cell identifier (PCI) may be mapped to an eNodeB. A UE may be within the coverage areas of multiple eNodeBs. One of these eNodeBs may be selected to serve the UE. The serving eNodeB may be selected based on various criteria including radio resource monitoring measurements and radio link monitoring measurements such as received power, path loss, signal-to-noise ratio (SNR), etc.

An eNodeB 14 may provide communication coverage for a macro cell, a small cell, a pico cell, a femto cell, and/or other types of cell. A macro cell may cover a relatively large geographic area (e.g., several kilometers in radius) and may allow unrestricted access by UEs 12 with service subscription. The term "small cell," as used herein, refers to a relatively low transmit power and/or a relatively small coverage area cell as compared to a transmit power and/or a coverage area of a macro cell. Further, the term "small cell" may include, but is not limited to, cells such as a femto cell, a pico cell, access point base stations, Home NodeBs, femto access points, or femto cells. For instance, a macro cell may cover a relatively large geographic area, such as, but not limited to, several kilometers in radius. In contrast, a pico cell may cover a relatively small geographic area and may allow unrestricted access by UEs 12 with service subscription. A femto cell may cover a relatively small geographic area (e.g., a home) and may allow restricted access by a UE 12 having association with the femto cell (e.g., UE 12 may be subscribed to a Closed Subscriber Group (CSG), for users in the home, etc.). An eNodeB 14 for a macro cell may be referred to as a macro eNodeB. An eNodeB 14 for a pico cell may be referred to as a pico eNodeB. An eNodeB 14 for a femto cell may be referred to as a femto eNodeB or a home eNodeB.

In an aspect, a UE 12 may also be in communication with a second RAT network such as network 24. The network 24 may be for example, a UTRA, CDMA, GSM, WiMax or other wide area network. The network 24 may also include a Wi-Fi local area network (LAN) or other similar network. The UE 12 may communicate with the network 24 via a base station 20. The base station 20 may be a station that communicates with the UE 12 and may also be referred to as an eNodeB, an access point, a NodeB, etc. The network 24 may also include a radio network controller 22 or other intermediate nodes such as routers, switches, etc. In an aspect, the network 24 may provide a service to be used simultaneously with the network 18. For example, the network 24 may provide voice services while the network 18 provides data services. The UE 12 may periodically monitor the network 24 for paging or other signaling even when no call with the network 24 is currently active. In another aspect, the base station 20 may be an eNodeB similar to eNodeB 14 and may be in communication with the EPC 16.

The UE 12 may be configured for performing measurements and monitoring for one or more of eNodeB 14 or base station 20. According to the present aspects, the UE 12 may include one or more processors 103 that may operate in combination with a modem component 40 for performing measurements and monitoring on received radio frequency (RF) signals. For example, the modem component 40 may receive communications 26 from eNodeB 14, which may include reference signals such as a cell-specific reference signal (CRS). The UE 12 may also receive signals 28, which may, at least in some cases, interfere with the communications 26 and produce different RRM and RLM measurements. For example, during guaranteed transmissions the signals 28 may interfere with the communications 26, whereas during opportunistic transmissions the communications 26 may only occur if the signals 28 are not present. Therefore, the communications 26 received during opportunistic transmissions may produce higher RRM and RLM measurements. In an aspect, the term "component" as used herein may be one of the parts that make up a system, may be hardware, firmware, and/or software, and may be divided into other components. The modem component 40 may be communicatively coupled to a transceiver 106, which may include a receiver 32 for receiving and processing RF signals and a transmitter 34 for processing and transmitting RF signals. The modem component 40 may include a measurement component 42 for obtaining measurements of a received RF signal, a sub-frame classifier 44 for identifying received sub-frames as either opportunistic transmissions or guaranteed transmissions, a value computing component 46 for computing measurement values based on obtained measurements for particular sub-frames or for subsets of sub-frames, a radio resource monitoring (RRM) component 48 for evaluating RRM measurement values, a radio link monitoring component 50 for monitoring a radio link between an eNodeB 14 and the UE 12, and a transmitting component 60 for performing uplink transmissions.

The receiver 32 may include hardware, firmware, and/or software code executable by a processor for receiving data, the code comprising instructions and being stored in a memory (e.g., computer-readable medium). The receiver 32 may be, for example, a radio frequency (RF) receiver. In an aspect, the receiver 32 may receive signals transmitted by the eNodeB 14. The receiver 32 may obtain measurements of the signals. For example, the receiver 32 may determine Ec/Io, SNR, a power amplitude of one or more signals, etc.

The transmitter 34 may include hardware, firmware, and/or software code executable by a processor for transmitting data, the code comprising instructions and being stored in a memory (e.g., computer-readable medium). The transmitter 34 may be, for example, a RF transmitter.

In an aspect, the one or more processors 103 can include one or more modem processors forming a modem 108. The various functions related to modem component 40 may be included in modem 108 and/or processors 103 and, in an aspect, can be executed by a single processor, while in other aspects, different ones of the functions may be executed by a combination of two or more different processors. For example, in an aspect, the one or more processors 103 may include any one or any combination of a modem processor, or a baseband processor, or a digital signal processor, or a transmit processor, or a transceiver processor associated with transceiver 106. In particular, the one or more processors 103 may implement components included in modem component 40, including the measurement component 42 for obtaining measurements of a received RF signal, the sub-frame classifier 44 for identifying received sub-frames as either opportunistic transmissions or guaranteed transmissions, the value computing component 46 for computing measurement values based on obtained measurements for particular sub-frames or for subsets of sub-frames, the RRM component 48 for evaluating RRM measurement values, the radio link monitoring component 50 for monitoring the radio link between an eNodeB 14 and the UE 12, and the transmitting component 60 for performing uplink transmissions.

The measurement component 42 may include hardware, firmware, and/or software code executable by a processor (e.g., processor(s) 103) for obtaining measurements of a received RF signal. In an aspect, for example, the measurement component 42 may include or control an RF receive chain including, for example, an antenna 102, RF front end 104, and the receiver 32. The measurement component 42 may obtain measurements or samples for each sub-frame or for individual symbols, or portions thereof, within a sub-frame. In an aspect, the measurement component 42 may obtain a received signal power amplitude, a reference signal power amplitude, a cell specific reference signal (CRS) measurement, etc.

The sub-frame classifier 44 may include hardware, firmware and/or software code executable by a processor (e.g., processor(s) 103) for identifying a first set of sub-frames including opportunistic transmissions and a second subset of sub-frames including guaranteed transmissions. In an aspect, for example, the sub-frame classifier 44 may include a processor configured to classify sub-frames based on measurements obtained during each sub-frame as well as a downlink frame structure and signaling. In an aspect, guaranteed sub-frames may be determined based on a downlink frame structure. For example, the eNodeB 14 may indicate in advance (e.g. via radio resource control (RRC) signaling or system information block (SIB) messages) which sub-frames will be designated for D-CET transmissions. The sub-frames designated for D-CET transmission may be considered as members of the first set of sub-frames including opportunistic transmissions. In an aspect, the sub-frames including opportunistic transmissions may be determined to be any sub-frame that does not include a guaranteed transmission. In another aspect, the sub-frame classifier 44 may further classify opportunistic sub-frames based on the presence of a cell specific reference signal (CRS) or an enhanced cell specific reference signal (eCRS). For example, sub-frames with a CRS or eCRS outside of the D-CET may be considered opportunistic sub-frame. Sub-frames that do not include a CRS or eCRS may be considered to be unused sub-frames (e.g., because the spectrum was unavailable). The UE 12 may consider sub-frames including a CRS or eCRS when determining RLM measurement values.

The value computing component 46 may include hardware, firmware, and/or software code executable by a processor (e.g., processor(s) 103) for computing measurement values based on obtained measurements for particular sub-frames or for subsets of sub-frames. In an aspect, for example, the value computing component 46 may compute a reference signal received power (RSRP) value by filtering reference signal amplitude measurements across both guaranteed sub-frames and opportunistic sub-frames. For example, filtering may include measuring the reference signal amplitude measurements during both guaranteed sub-frames and opportunistic sub-frames. In an aspect, a weight or forgetting factor may be applied to place more emphasis on recent sub-frames. In another aspect, for example, the value computing component 46 may determine separate received signal strength indicator (RSSI) values based on subsets of sub-frames. For example, a first RSSI value, $RSSI_{OPP}$, may be based on received signal amplitude measurements during opportunistic sub-frames. A second RSSI value, $RSSI_{CET}$, may be based on received signal amplitude measurements during guaranteed sub-frames. In an aspect, the value computing component 46 may compute separate reference signal received quality (RSRQ) values based on subsets of sub-frames. For example, the value computing component 46 may compute a first RSRQ value, $RSRQ_{OPP}$, based on a number of used resource blocks (N) the RSRP value and the $RSSI_{OPP}$ value. For example, the $RSRQ_{OPP}$ may be (N*RSRP)/$RSSI_{OPP}$ The value computing component 46 may compute a second RSRQ value, $RSRQ_{CET}$, based on the number of used resource blocks, the RSRP value and the $RSSI_{CET}$ value. For example, $RSRQ_{CET}$ may be (N*RSRP)/$RSSI_{CET}$.

The value computing component 46 may also compute separate signal to interference plus noise ratio (SINR) values based on subsets of sub-frames. In an aspect, for example, the value computing component 46 may compute a first SINR value, $SINR_{OPP}$, for a subset of sub-frames including opportunistic transmissions. The SINR value may be based on measurements of the CRS or eCRS. In an aspect, the value computing component 46 may not be able to compute an accurate $SINR_{OPP}$ value. For example, the eNodeB 14 may not be able to transmit a CRS or eCRS during opportunistic sub-frames. Accordingly, the CRS measurements may not be available during opportunistic sub-frames. The $SINR_{OPP}$ value may also be considered unavailable when an unreliable value is produced based on insufficient measurements. For example, the $SINR_{OPP}$ value may be considered unreliable when the UE 12 does not receive a threshold number of sub-frames including a CRS or eCRS. The value computing component 46 may indicate whether the $SINR_{OPP}$ value is available. As another example, the value computing component 46 may compute a second SNR value, $SINR_{CET}$, based on CRS measurements associated with guaranteed sub-frames.

The RRM component 48 may include hardware, firmware, and/or software code executable by a processor (e.g., processor(s) 103) for evaluating RRM measurement values. In an aspect, the RRM component 48 may be configured by the eNodeB to monitor for certain types of events such as cell change events. For example, the RRM component 48 may compare an RRM measurement of the eNodeB 14 to a threshold value or an RRM measurement for another base station 20. In an aspect, the eNodeB 14 may configure which measurement values to compare. For example, the RRM component 48 may be configured to compare $RSRQ_{OPP}$ to a threshold value. The $RSRQ_{OPP}$ may, for example, be compared for events A1, A2, or A4, where only a single cell is involved. In an aspect, the $RSRQ_{OPP}$ value may provide a more realistic measurement for actual conditions during the opportunistic transmissions. As another example, the RRM component 48 may be configured to compare the $RSRQ_{CET}$ value measured for eNodeB 14 to an $RSRQ_{CET}$ value determined for another eNodeB. For example, the $RSRQ_{CET}$ may, for example, be compared for events A3 or A5, where the serving cell is compared to a neighbor cell. In an aspect, the $RSRQ_{CET}$ may be better for comparing eNodeBs because the $RSRQ_{CET}$ may account for interference. When the RRM component 48 detects a configured event, the RRM component 48 may transmit a measurement report using transmitting component 60. In an aspect, for example, the measurement report may trigger a cell change such as a handover or cell reselection.

The radio link monitoring component 50 may include hardware, firmware, and/or software code executable by a processor (e.g., processor(s) 103) for monitoring a radio link between an eNodeB 14 and the UE 12. In an aspect, the radio link monitoring component 50 may include or may be implemented by a receiver configured to demodulate and decode received RF signals. For example, the radio link monitoring component 50 may demodulate and decode system information blocks (SIBs) transmitted by the eNodeB 14. In an aspect, the eNodeB 14 may transmit a SIB every 80 milliseconds (ms). The radio link monitoring component 50 may be further configured to determine whether decoding of each SIB is successful. In an aspect, the radio link monitoring component 50 may include a SIB success counter 52 and a SIB failure counter 54. The SIB success counter 52 may include a memory (e.g., RAM) configured to maintain a count of successful SIB decodings. For example, the SIB success counter 52 may indicate a number of consecutive successful SIB decodings, or a number of successful SIB decodings during a period of time. Conversely, the SIB failure counter 54 may include a memory (e.g., RAM) configured to indicate a number of consecutive unsuccessful or failed SIB decodings, or a number of unsuccessful SIB decodings during a period of time.

The radio link monitoring component 50 may be further configured to monitor a radio link condition of the wireless device based on the SINR values, the SIB success counter 52, and/or the SIB failure counter 54. In an aspect, monitoring the radio link condition of the wireless device includes determining whether the UE 12 is synchronized with the eNodeB 14. In an aspect, for example, when the $SINR_{OPP}$ value is available, the radio link monitoring component 50 may determine whether the UE 12 is synchronized with the eNodeB 14 by comparing the $SINR_{OPP}$ value with a threshold value. The threshold value may be configurable by the eNodeB 14. In another aspect, when the $SINR_{OPP}$ is unavailable, the radio link monitoring component 50 may determine that the UE 12 is synchronized when the $SINR_{CET}$ value exceeds a first threshold value or the value of the SIB success counter 52 exceeds a second threshold value. Conversely, when the $SINR_{OPP}$ value is unavailable, the radio link monitoring component 50 may determine that the UE 12 is not synchronized when the $SINR_{CET}$ value is less than the first threshold value and the value of the SIB failure counter 54 exceeds a second threshold. The first threshold value and the second threshold value may be configured by the eNodeB 14. In an aspect, the radio link monitoring component 50 may determine that a radio link failure (RLF) has occurred when the UE 12 is not synchronized with the eNodeB 14.

The transmitting component 60 may include hardware, firmware, and/or software code executable by a processor (e.g., processor(s) 103) for performing uplink transmissions. In an aspect, for example, the transmitting component 60 may include or control a transmitter (e.g., transmitter 34). The transmitting component 60 may include a clear channel assessment (CCA) component 62, a CCA timer 64, and a radio link control (RLC) timer 66.

In an aspect, the CCA component 62 may include hardware, firmware, and/or software code executable by a processor (e.g., processor(s) 103) configured to determine whether a channel is available for a transmission. In an aspect, the CCA component 62 may use measurements provided by the measurement component 42 to determine the received signal energy on a channel. In another aspect, CCA component 62 may include a receiver (not shown) configured to measure received signal energy on a channel. CCA component 62 may determine that a channel is clear when the signal energy falls below a threshold value. In an aspect, CCA component 62 may determine whether a channel is available according to regulations or a standard. For example, EN 301.893 may define LBT procedures. IEEE 802.11 and 802.15 standards may define CCA procedures. Generally, the CCA procedures may involve monitoring a channel for a CCA duration or time slot, for example 20 microseconds (μs). If the time slot is clear (e.g., the communications medium is available or accessible (signal energy falls below a threshold value)), the device may begin using the channel. If the channel is not clear, the device may determine a random backoff counter for the channel. Each time the device detects a clear time slot, the random backoff counter may be decremented. In an aspect, the UE 12 may perform clear channel assessment before an uplink transmission procedure. In an aspect, an uplink transmission procedure may include a random access channel (RACH) procedure. The CCA component 62 may perform a CCA procedure before the RACH procedure. In an aspect, the uplink transmission procedure may include a scheduled uplink transmission in a sub-frame. The CCA component 62 may perform a CCA procedure before the scheduled uplink sub-frame. In an aspect, the UE 12 may continue to transmit in subsequent consecutive sub-frames. If the UE 110 is not scheduled to transmit in a sub-frame, the CCA component 62 may perform a CCA procedure again before the next scheduled uplink sub-frame. In an aspect, the CCA procedure may not be completed within a time period. For example, another wireless device may be transmitting on the channel and the UE 12 may be unable to access the channel. In an aspect, an uplink CCA exempt transmission (U-CET) may be defined as a transmission for which the UE 12 is not required to perform a CCA procedure. Similar to D-CET, U-CET may be limited to a certain percentage of sub-frames or a minimum time between U-CET sub-frames. In an aspect, the U-CET sub-frame timing may be based on the D-CET sub-frame timing.

The CCA timer 64 may be configured to measure a duration of time used for a CCA procedure. The CCA timer 64 may be configured with a maximum duration for a CCA procedure. In an aspect, the CCA timer 64 may be started when the CCA procedure is initiated by the media access (MAC) layer for certain transmissions. In an aspect, the CCA timer 64 may be used for RACH transmissions such as a timing advance, a random access message 1 identifying the UE 12, a scheduling request, or a buffer status report. When operating in unlicensed spectrum, the UE 12 may not be able to perform a RACH transmission immediately due to the CCA procedure. Accordingly, a number of RACH transmissions may not be indicative of radio link quality. The CCA timer 64 may be used to determine whether RACH transmissions are successful. In another aspect, the CCA timer 64 may also be started for a scheduled transmission in an uplink sub-frame. If the CCA timer exceeds the configured duration, the transmitting component 60 may declare an RLF because the UE 12 is unable to transmit.

The RLC timer 66 may be configured to measure a duration of time used for a transmission at the RLC layer. In an aspect, the RLC protocol may use an acknowledged mode to determine whether protocol data units (PDUs) have been successfully transmitted. The transmitting component may generate an RLC PDU and start the RLC timer 66 when the RLC PDU is transmitted to lower layers. If the RLC layer does not receive an acknowledgement for the RLC PDU, the transmitting component 60 may retransmit the RLC PDU. Because of the CCA procedure at the physical (PHY) layer, RLC retransmission in unlicensed spectrum may not have a fixed round-trip time, so the number of retransmissions may not be indicative of the radio link quality. For example, the RLC layer may transmit the PDU a single time, but be unable to perform a retransmission due to channel usage. Therefore, even though the channel conditions are poor, the PDU may have no retransmissions. The RLC timer 66 may be configured with a maximum duration for RLC transmissions. For example, the RLC timer 66 may be started each time an RLC PDU is transmitted. In an aspect, the transmitting component 60 may declare an RLF after a maximum number of RLC retransmissions for the PDU or when the RLC timer 66 for the PDU exceeds the maximum duration.

Moreover, in an aspect, UE 12 may include RF front end 104 and transceiver 106 for receiving and transmitting radio transmissions, for example, communications 26 transmitted by the eNodeB 14 or base station 20. For example, transceiver 106 may receive a signal that includes a reference signal (e.g., CRS)) from each network entity, such as communications 26 from eNodeB 14 and signal 28 from base station 20, which in this example combine to form received signal 31. The transceiver 106 may measure the received reference signal in order to determine signal quality and for providing feedback to the eNodeB 14. For example, transceiver 106 may communicate with modem 108 to transmit messages (e.g., radio resource control messages based on RRM measurements) generated by modem component 40 and to receive messages (e.g. radio resource control commands) and forward them to modem component 40.

RF front end 104 may be connected to one or more antennas 102 and can include one or more low-noise amplifiers (LNAs) 141, one or more switches 142, 143, one or more power amplifiers (PAs) 145, and one or more filters 144 for transmitting and receiving RF signals. In an aspect, components of RF front end 104 can connect with transceiver 106. Transceiver 106 may connect to one or more modems 108 and processor 103.

In an aspect, LNA 141 can amplify a received signal at a desired output level. In an aspect, each LNA 141 may have a specified minimum and maximum gain values. In an aspect, RF front end 104 may use one or more switches 142, 143 to select a particular LNA 141 and its specified gain value based on a desired gain value for a particular application. In an aspect, the RF front end 104 may provide measurements (e.g., Ec/Io) and/or applied gain values to the modem component 40.

Further, for example, one or more PA(s) 145 may be used by RF front end 104 to amplify a signal for an RF output at a desired output power level. In an aspect, each PA 145 may have a specified minimum and maximum gain values. In an aspect, RF front end 104 may use one or more switches 143, 146 to select a particular PA 145 and its specified gain value based on a desired gain value for a particular application.

Also, for example, one or more filters 144 can be used by RF front end 104 to filter a received signal to obtain an input RF signal. Similarly, in an aspect, for example, a respective filter 144 can be used to filter an output from a respective PA 145 to produce an output signal for transmission. In an aspect, each filter 144 can be connected to a specific LNA 141 and/or PA 145. In an aspect, RF front end 104 can use one or more switches 142, 143, 146 to select a transmit or receive path using a specified filter 144, LNA, 141, and/or PA 145, based on a configuration as specified by transceiver 106 and/or processor 103.

Transceiver 106 may be configured to transmit and receive wireless signals through antenna 102 via RF front end 104. In an aspect, transceiver may be tuned to operate at specified frequencies such that UE 12 can communicate with, for example, eNodeB 14 or base station 20. In an aspect, for example, modem 108 can configure transceiver 106 to operate at a specified frequency and power level based on the UE configuration of the UE 12 and communication protocol used by modem 108.

In an aspect, modem 108 can be a multiband-multimode modem, which can process digital data and communicate with transceiver 106 such that the digital data is sent and received using transceiver 106. In an aspect, modem 108 can be multiband and be configured to support multiple frequency bands for a specific communications protocol. In an aspect, modem 108 can be multimode and be configured to support multiple operating networks and communications protocols. In an aspect, modem 108 can control one or more components of UE 12 (e.g., RF front end 104, transceiver 106) to enable transmission and/or reception of signals from the network based on a specified modem configuration. In an aspect, the modem configuration can be based on the mode of the modem and the frequency band in use. In another aspect, the modem configuration can be based on UE configuration information associated with UE 12 as provided by the network during cell selection and/or cell reselection.

UE 12 may further include a memory 130, such as for storing data used herein and/or local versions of applications or modem component 40 and/or one or more of its subcomponents being executed by processor 103. Memory 130 can include any type of computer-readable medium usable by a computer or processor 103, such as random access memory (RAM), read only memory (ROM), tapes, magnetic discs, optical discs, volatile memory, non-volatile memory, and any combination thereof. In an aspect, for example, memory 130 may be a computer-readable storage medium that stores one or more computer-executable codes defining modem component 40 and/or one or more of its subcomponents, and/or data associated therewith, when UE 12 is operating processor 103 to execute modem component 40 and/or one or more of its subcomponents. In another aspect, for example, memory 130 may be a non-transitory computer-readable storage medium.

FIGS. 2-5 illustrate flowcharts of example methods that may be performed, for example, by a UE such as UE 12 (FIG. 1). While, for purposes of simplicity of explanation, the methods are shown and described as a series of acts, it is to be understood and appreciated that the methods (and further methods related thereto) is/are not limited by the order of acts, as some acts may, in accordance with one or more aspects, occur in different orders and/or concurrently with other acts from that shown and described herein. For example, it is to be appreciated that a method could alternatively be represented as a series of interrelated states or events, such as in a state diagram. Moreover, not all illustrated acts may be required to implement a method in accordance with one or more features described herein.

Figure 2:
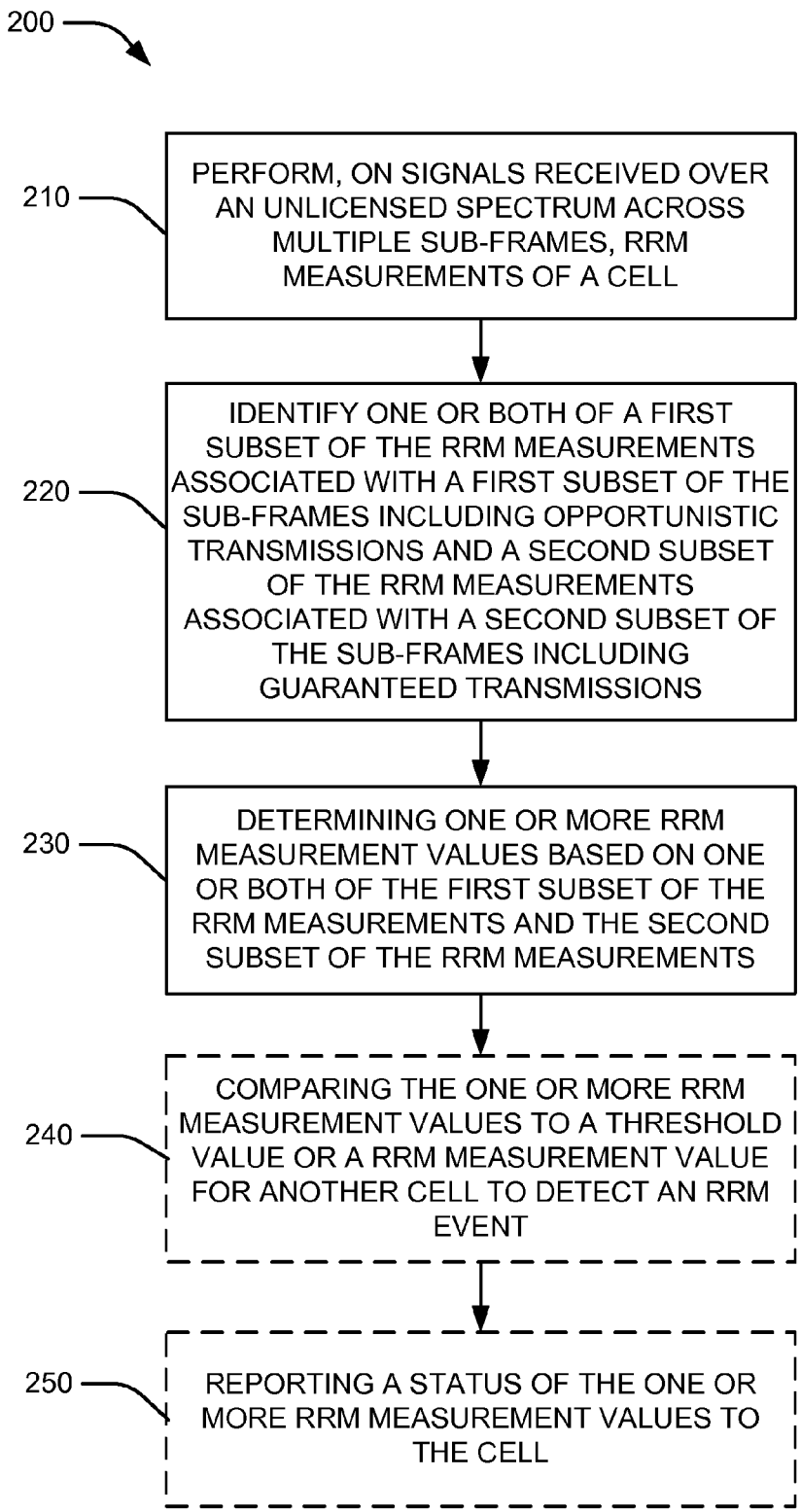
FIG. 2 is a flow diagram conceptually illustrating an example of a method of performing control plane measurements in a wireless device in accordance with an aspect of the present disclosure.

Referring to FIG. 2, in an operational aspect, a UE such as UE 12 (FIG. 1) may perform an aspect of a method 200 of wireless communication.

In block 210, the method 200 may include performing, on signals received over an unlicensed spectrum across multiple sub-frames, RRM measurements of a cell. In an aspect, for example, the measurement component 42 may perform, on the signals received over the unlicensed spectrum across the multiple sub-frames, the RRM measurements of a cell. In an aspect, performing the RRM measurements may include measuring a reference signal received power (RSRP) for a first subset of sub-frames and for a second subset of sub-frames. In an aspect, performing the RRM measurements may include measuring a first received signal strength indicator (RSSI) for a first subset of sub-frames and a second RSSI for a second subset of sub-frames.

In block 220, the method 200 may include identifying one or both of a first subset of the RRM measurements associated with a first subset of the sub-frames including opportunistic transmissions and a second subset of the RRM measurements associated with a second subset of the sub-frames including guaranteed transmissions. In an aspect, for example, the sub-frame classifier 44 may identify the first subset of the RRM measurements associated with the first subset of the sub-frames including opportunistic transmissions and the second subset of the RRM measurements associated with the second subset of the sub-frames including guaranteed transmissions.

In block 230, the method 200 may include determining one or more RRM measurement values based on one or both of the first subset of the RRM measurements and the second subset of the RRM measurements. In an aspect, for example, the value computing component 46 may determine the one or more RRM measurement values based on one or both of the first subset of the RRM measurements and the second subset of the RRM measurements. In an aspect, determining the one or more RRM measurement values may include combining, into a single RSRP value, the RSRP measurements associated with the first set of sub-frames and the RSRP measurements associated with the second set of sub-frames. For example, the value computing component 46 may combine the RSRP measurements by computing a weighted average of the RSRP measurements associated with the first set of sub-frames and the RSRP measurements associated with the second set of sub-frames. The weights may be based on the number of sub-frames in each set. In an aspect, determining the one or more RRM measurement values may include determining a first reference signal received quality (RSRQ) value for the first set of sub-frames based on the first RSSI measurements and a second RSRQ value for the second set of sub-frames based on the second RSSI measurements.

In block 240, the method 200 may optionally include comparing the one or more RRM measurement values to a threshold value or an RRM measurement value for another cell to detect an RRM event. In an aspect, for example, the RRM component 48 may compare the one or more RRM measurement values to the threshold value or the RRM measurement value for another cell to detect the RRM event. In an aspect, the RRM component 48 may compare the first RSRQ value to a threshold value. In another aspect, the RRM component 48 may compare the second RSRQ value to a received signal quality for a reference signal for a different cell. In an aspect, the eNodeB 14 may signal which RRM measurement values to compare.

In block 250, the method 200 may optionally include reporting a status of the one or more RRM measurement values to the cell. In an aspect, for example, the transmitting component 60 may report a status of the one or more RRM measurement values to the cell. For example, the transmitting component 60 may send a measurement report indicating the RRM measurement values or the event detected by the RRM measurement values.

Figure 3:
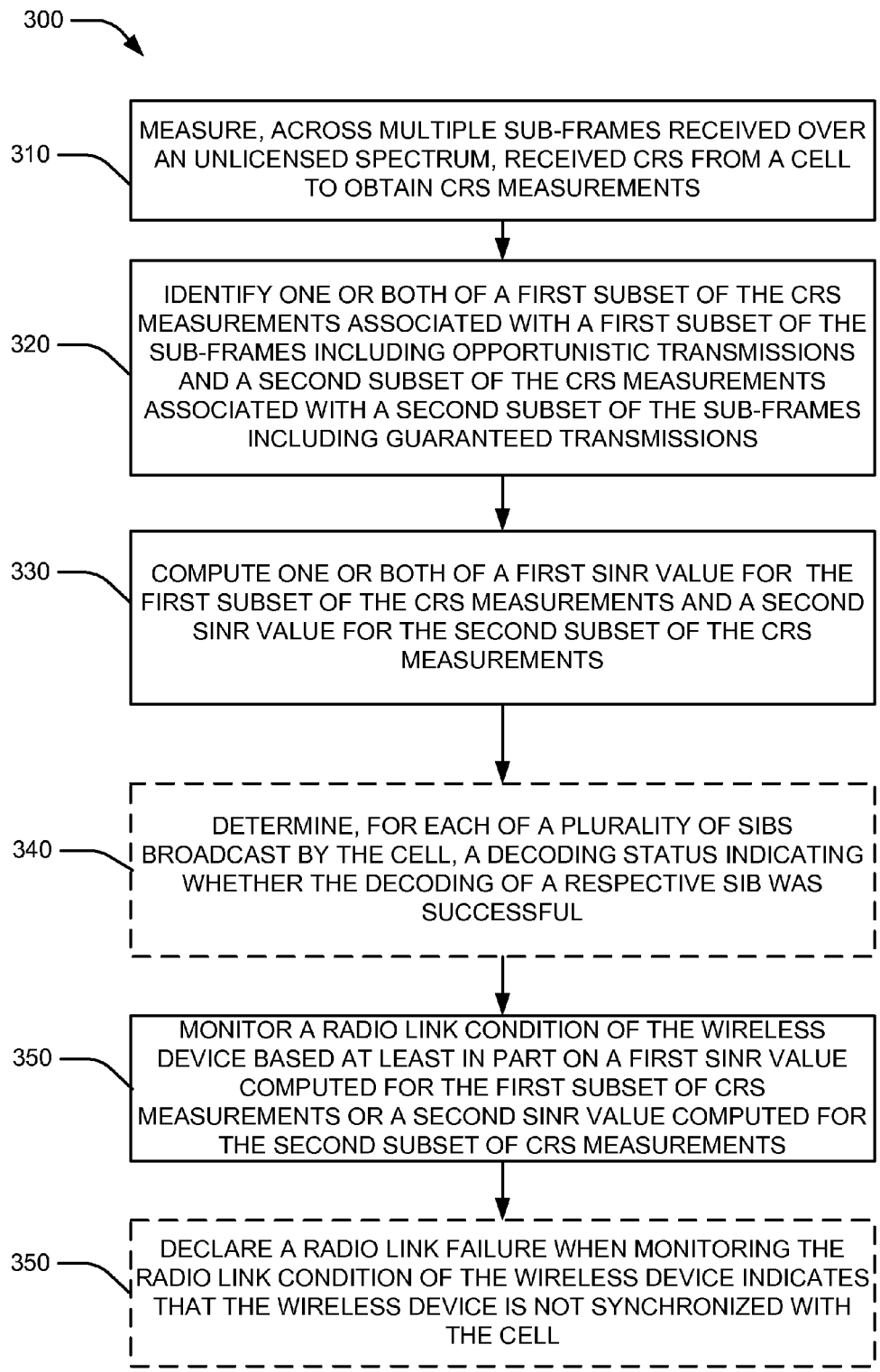
FIG. 3 is a flow diagram conceptually illustrating another example of a method of performing control plane measurements in a wireless device in accordance with an aspect of the present disclosure.

Referring to FIG. 3, in an operational aspect, a UE such as UE 12 (FIG. 1) may perform an aspect of a method 300 of wireless communication.

In block 310, the method 300 may include measuring, across multiple sub-frames received over an unlicensed spectrum, received cell-specific reference signals (CRS) from a cell to obtain CRS measurements. In an aspect, for example, the measurement component 42 may measure, across multiple sub-frames received over an unlicensed spectrum, the received CRS from a cell provided by the eNodeB 14 to obtain CRS measurements.

In block 320, the method 300 may include identifying one or both of a first subset of the CRS measurements associated with a first subset of the sub-frames including opportunistic transmissions and a second subset of the CRS measurements associated with a second subset of the sub-frames including guaranteed transmissions. In an aspect, for example, the sub-frame classifier 44 may identify the first subset of the CRS measurements associated with the first subset of the sub-frames including opportunistic transmissions and the second subset of the CRS measurements associated with the second subset of the sub-frames including guaranteed transmissions.

In block 330, the method 300 may include computing one or both of a first signal to interference plus noise ratio (SINR) value for the first subset of CRS measurements and a second SINR value for the second subset of CRS measurements. In an aspect, for example, the value computing component 46 may compute the first SINR value for the first subset of CRS measurements and/or the second SINR value for second subset of CRS measurements. For example, the value computing component 46 may compute a $SINR_{OPP}$ for the first set of CRS measurements and/or compute a $SIN-R_{OPP}$ for the second subset of the CRS measurements.

In block 340, the method 300 may optionally include determining, for each of a plurality of SIBs broadcast by the cell, a decoding status indicating whether the decoding of a respective SIB was successful. In an aspect, for example, a radio link monitoring component 50 may decode the plurality of SIBs broadcast by the cell; determine, for each of the SIBs, a decoding status indicating whether the decoding of a respective SIB was successful; and maintain a first counter (e.g., SIB failure counter 54) of decodings of the SIBs having an unsuccessful decoding status, and a second counter (e.g., SIB success counter 52) of decodings of the SIBs having a successful decoding status.

In block 350, the method 300 may include monitoring a radio link condition of the wireless device based at least in part on a first SINR value computed for the first subset of CRS measurements or a second SINR value computed for the second subset of CRS measurements. In an aspect, for example, the radio link monitoring component 50 may monitor a radio link condition of the wireless device based at least in part on a first SINR value computed for the first subset of CRS measurements or a second SINR value computed for the second subset of CRS measurements. In an aspect, monitoring the radio link condition of the wireless device may include determining whether the wireless device is synchronized with the cell. In an aspect, monitoring the radio link condition of the wireless device may include determining that the first SINR value is available and determining whether the wireless device is synchronized with the cell based on the first SINR value. For example, the radio link monitoring component 50 may determine that the wireless device is synchronized when the first SINR value is available and exceeds a threshold, and determine that the wireless device is not synchronized when the first SINR value is available and is less than the threshold. In another aspect, monitoring the radio link condition of the wireless device may include determining that the first SINR value is not currently available and determining that the wireless device is not synchronized with the cell when the second SINR value indicates that the wireless device is not synchronized with the cell and the first counter exceeds a threshold number of unsuccessful decodings. In another aspect, monitoring the radio link condition of the wireless device may include determining that the first SINR value is not currently available and determining that the wireless device is synchronized with the cell when the second SINR value indicates that the wireless device is synchronized with the cell or the second counter exceeds a threshold number of successful decodings.

In block 360, the method 300 may optionally include declaring a radio link failure when monitoring the radio link condition of the wireless device indicates that the wireless device is not synchronized with the cell. In an aspect, for example, the radio link monitoring component 50 may declare a radio link failure when monitoring the radio link condition of the wireless device indicates that the wireless device is not synchronized with the cell. In an aspect, the UE 12 may attempt to reconnect to a cell and report the RLF.

Figure 4:
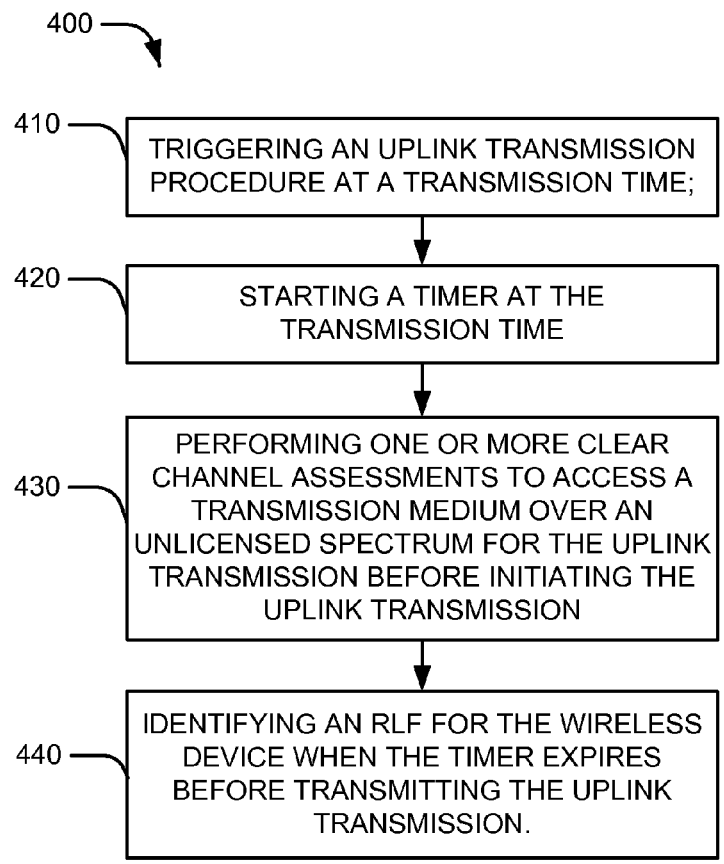
FIG. 4 is a flow diagram conceptually illustrating an example of a method of handling a radio link failure in a wireless device in accordance with an aspect of the present disclosure.

Referring to FIG. 4, in an operational aspect, a UE such as UE 12 (FIG. 1) may perform an aspect of a method 400 of wireless communication.

In block 410, the method 400 may include triggering an uplink transmission procedure at a transmission time. In an aspect, for example, the transmitting component 60 may trigger the uplink transmission procedure at the transmission time. The uplink transmission procedure may be a random access procedure or an uplink data transmission procedure. The transmission time may be a time when the transmitting component 60 first triggers the transmission.

In block 420, the method 400 may include starting a timer at the transmission time. In an aspect, for example, the CCA timer 64 may start at the transmission time.

In block 430, the method 400 may include performing one or more clear channel assessments to access a transmission medium over an unlicensed spectrum for the uplink transmission before initiating the uplink transmission. In an aspect, for example, the CCA component 62 may perform the one or more clear channel assessments to access the transmission medium over an unlicensed spectrum for the uplink transmission before initiating the uplink transmission.

In block 440, the method 400 may include identifying an RLF for the wireless device when the timer expires before transmitting the uplink transmission. In an aspect, for example, the transmitting component 60 may identify an RLF for the wireless device when the timer expires before transmitting the uplink transmission. In an aspect, the UE 12 may attempt to reconnect to a cell and report the RLF.

Figure 5:
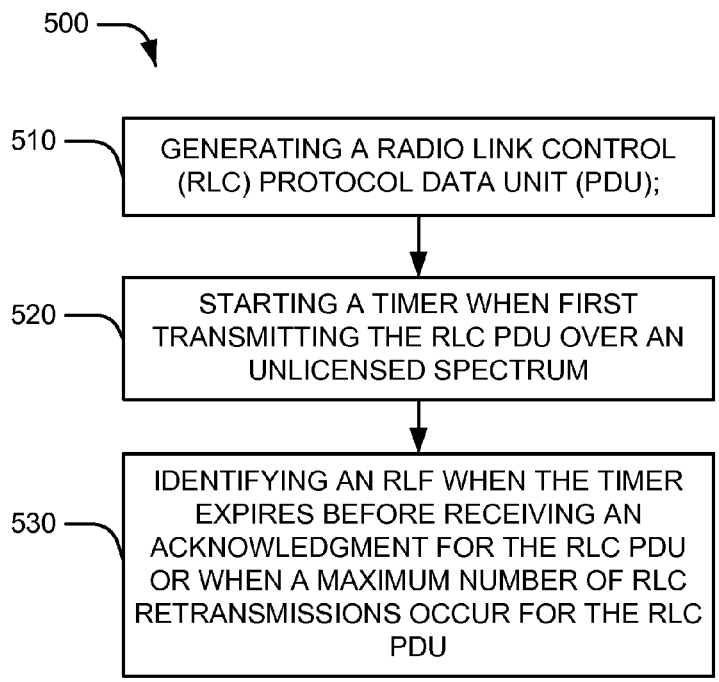
FIG. 5 is a flow diagram conceptually illustrating another example of a method of handling a radio link failure in a wireless device in accordance with an aspect of the present disclosure.

Referring to FIG. 5, in an operational aspect, a UE such as UE 12 (FIG. 1) may perform an aspect of a method 500 of wireless communication.

In block 510, the method 500 may include generating a radio link control (RLC) protocol data unit (PDU). In an aspect, the transmitting component 60 may generate a radio link control (RLC) protocol data unit (PDU).

In block 520, the method 500 may include starting a timer when first transmitting the RLC PDU over an unlicensed spectrum. In an aspect, for example, the RLC timer 66 may be started when first transmitting the RLC PDU over an unlicensed spectrum. In an aspect, a duration of the timer may be configured based on a radio bearer associated with the RLC PDU.

In block 530, the method 500 may include identifying an RLF when the timer expires before receiving an acknowledgment for the RLC PDU or when a maximum number of RLC retransmissions occur for the RLC PDU. In an aspect, for example, the transmitting component 60 may identify an RLF when the timer expires before receiving an acknowledgment for the RLC PDU or when a maximum number of RLC retransmissions occur for the RLC PDU. In an aspect, the UE 12 may attempt to reconnect to a cell and report the radio link failure.

Figure 6:
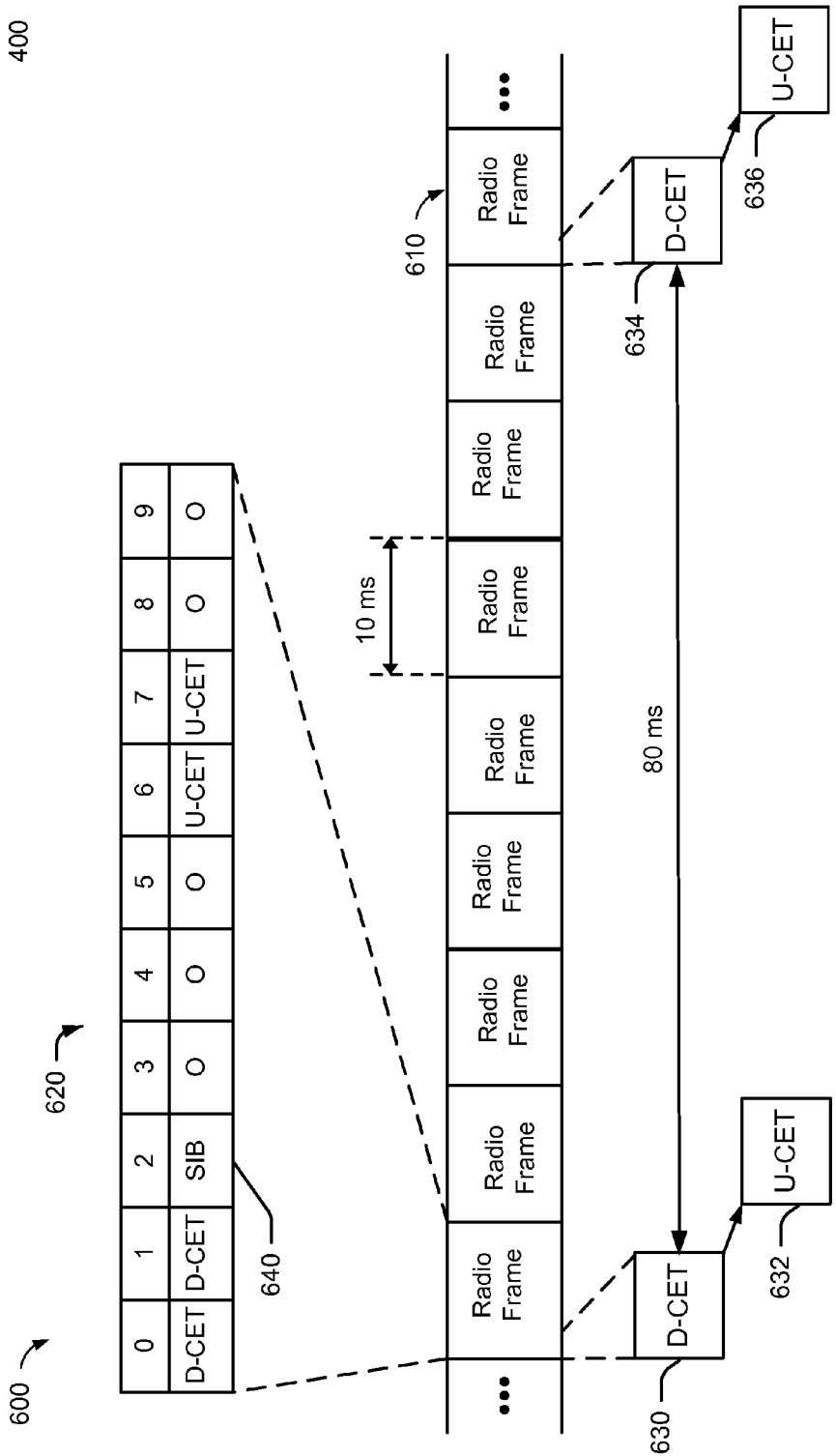
FIG. 6 is a block diagram conceptually illustrating a radio frame structure in accordance with an aspect of the present disclosure.

FIG. 6 is a block diagram conceptually illustrating an example of a frame structure 600 in a telecommunications system in accordance with an aspect of the present disclosure. The transmission timeline for the downlink may be partitioned into units of radio frames 602. Each radio frame 602 may have a predetermined duration (e.g., 10 milliseconds (ms), 4 ms, or 2 ms) and may be partitioned into, e.g., 10 sub-frames 620 with indices of 0 through 9.

A first D-CET transmission 630 may occur during one of the radio frames 610. In an aspect, as illustrated, the D-CET transmission may use one or more sub-frames 620. The D-CET transmission 630 may be followed by a U-CET transmission 632 in a later sub-frame of the same radio frame, or in a different radio frame. A second D-CET transmission 634 may occur during a later radio frame 610. In an aspect, the second D-CET transmission 634 may be scheduled, for example, 80 ms after the D-CET transmission 630. A second U-CET transmission 636 may follow the second D-CET transmission 634. In an aspect using time division duplexing (TDD), the U-CET transmissions 632, 634 may be duplexed using the same carrier as the downlink transmissions. In an aspect using frequency division duplexing (FDD), the U-CET transmissions 632, 634 may be transmitted on a second carrier, which may be synchronized with the downlink carrier. The sub-frames 620 used for the D-CET transmissions may be considered sub-frames associated with guaranteed transmissions. For example, sub-frames with indices 0 and 1 may be associated with guaranteed transmissions. The other sub-frames 620 may be considered sub-frames associated with opportunistic transmissions.

In an aspect, the frame structure 600 may also include SIBs 640 transmitted by the eNodeB 14. A SIB 640 may include information about the eNodeB 14 such as timing information, access parameters, RRM measurement configuration, RLM measurement configuration, neighbor lists, etc. In an aspect, the SIBs 640 may be periodically transmitted. In an aspect, a SIB 640 may be transmitted every 80 ms. The SIBs 640 may be transmitted within the D-CET transmissions 630 or may be transmitted in opportunistic sub-frames.

Figure 7:
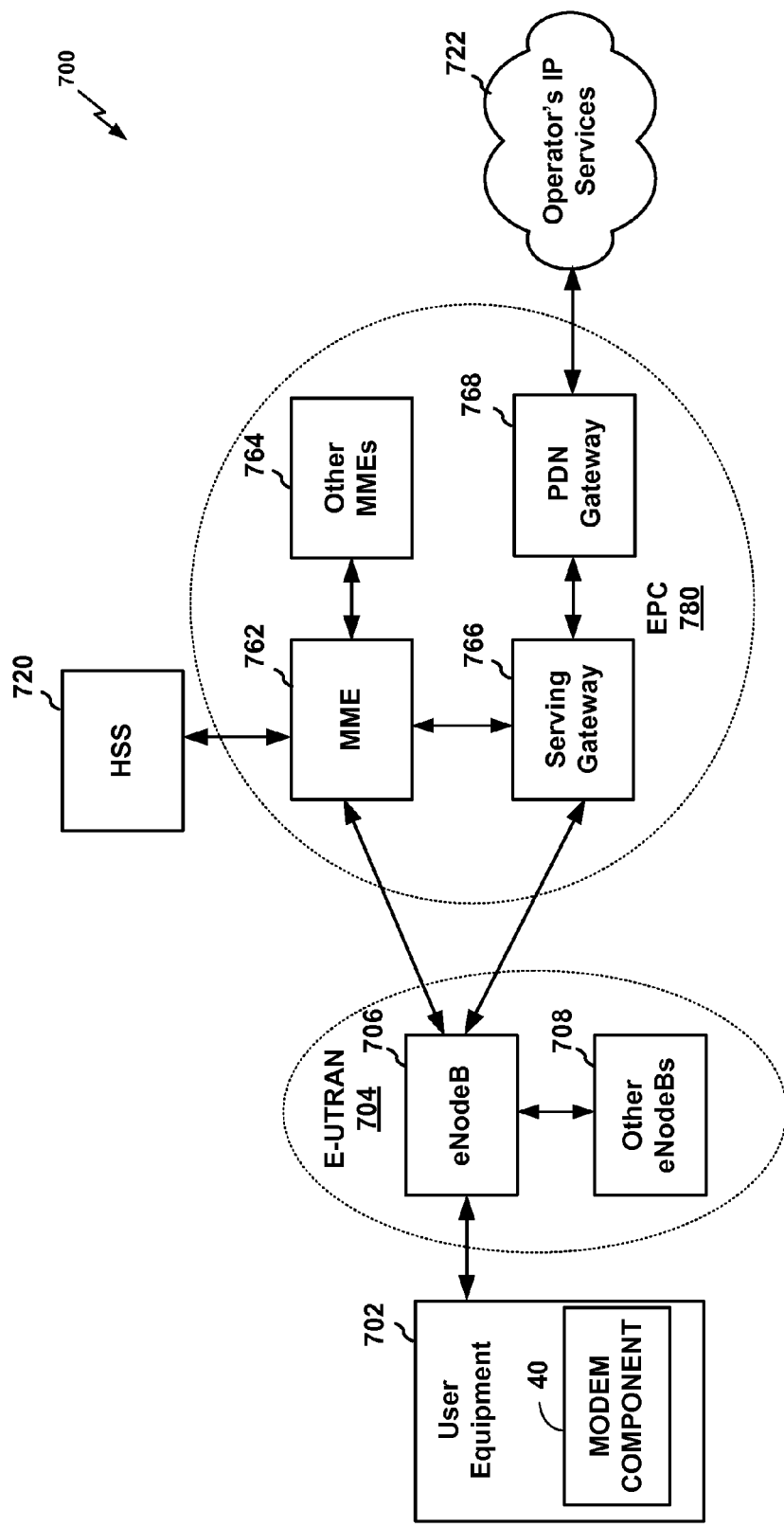
FIG. 7 is a block diagram conceptually illustrating an example of a telecommunications system in accordance with an aspect of the present disclosure.

FIG. 7 is a diagram illustrating a long term evolution (LTE) network architecture 700 employing various apparatuses of wireless communications system 10 (FIG. 1) and may include one or more UEs 12 (FIG. 1) having a modem component 40, where the UE 12 may correspond to user equipment 702, for example. The LTE network architecture 700 may be referred to as an Evolved Packet System (EPS) 700. EPS 700 may include one or more user equipment (UE) 702, an Evolved UMTS Terrestrial Radio Access Network (E-UTRAN) 704, an Evolved Packet Core (EPC) 780, a Home Subscriber Server (HSS) 720, and an Operator's IP Services 722. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 706 and other eNBs 708. The eNB 706 and 708 may each be an example of an eNodeB 14 (FIG. 1). The eNBs 706, 708 may receive measurement reports transmitted from the UE 702 including a modem component 40. The eNB 706 may configure the modem component 40 of the UE 702 to perform physical layer procedures including radio measurements and event reporting. In an aspect, according to the present disclosure, the eNB 706 may indicate which measurement values to determine and which events to report. For example, the eNB 706 may indicate whether the UE 702 should use the $RSRQ_{OPP}$ or the $RSRQ_{CET}$. The eNB 706 provides user and control plane protocol terminations toward the UE 702. The eNB 708 may be connected to the other eNBs 708 via an X2 interface (i.e., backhaul). The eNB 706 may also be referred to by those skilled in the art as a base station, a base transceiver station, a radio base station, a radio transceiver, a transceiver function, a basic service set (BSS), a small cell, an extended service set (ESS), or some other suitable terminology. The eNB 706 provides an access point to the EPC 780 for a UE 702.

The eNB 706 is connected by an S1 interface to the EPC 780. The EPC 780 includes a Mobility Management Entity (MME) 762, other MMEs 764, a Serving Gateway 766, and a Packet Data Network (PDN) Gateway 768. The MME 762 is the control node that processes the signaling between the UE 702 and the EPC 780. Generally, the MME 762 provides bearer and connection management. All user IP packets are transferred through the Serving Gateway 766, which itself is connected to the PDN Gateway 768. The PDN Gateway 768 provides UE IP address allocation as well as other functions. The PDN Gateway 768 is connected to the Operator's IP Services 722. The Operator's IP Services 722 includes the Internet, the Intranet, an IP Multimedia Subsystem (IMS), and a PS Streaming Service (PSS).

Figure 8:
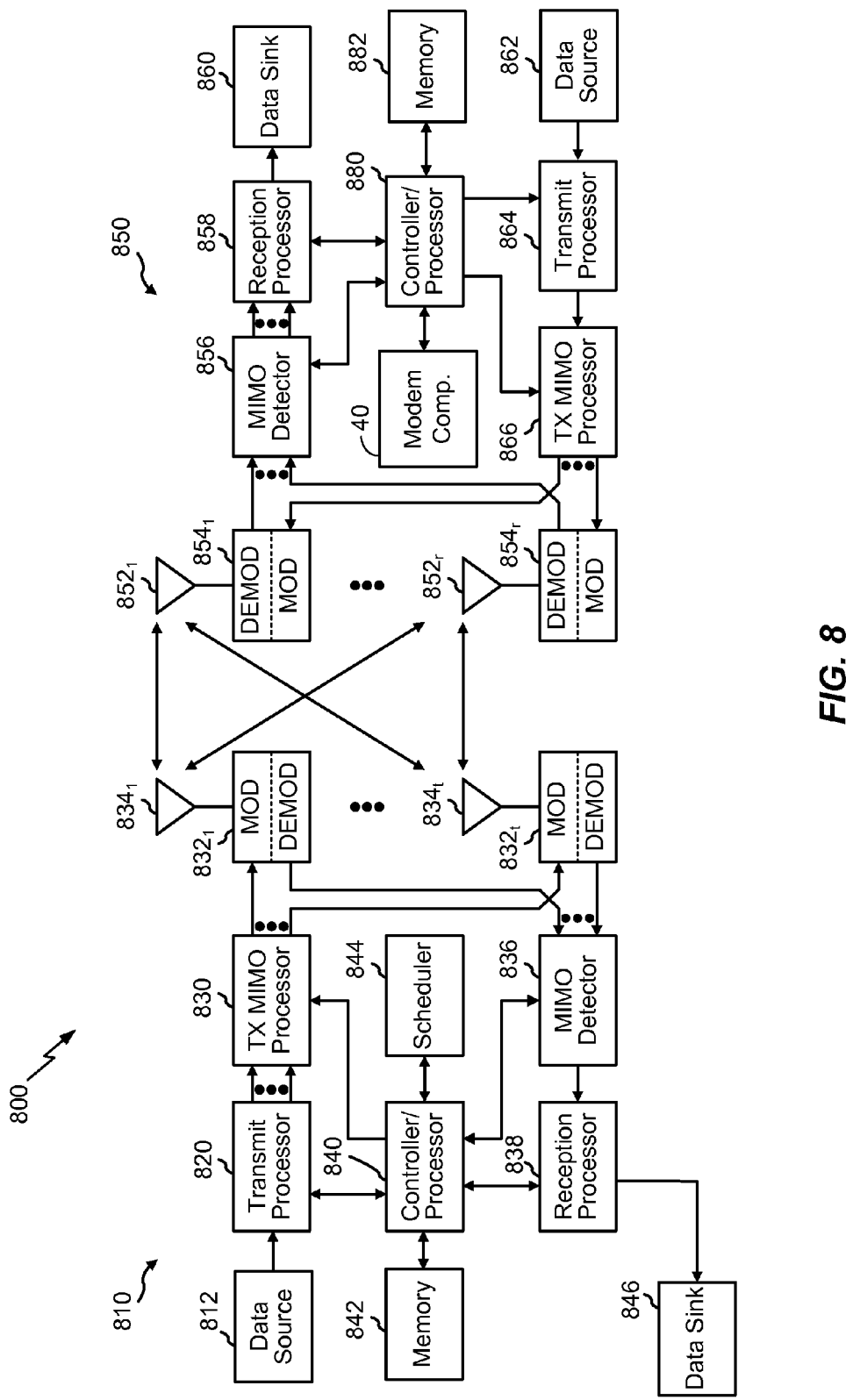
FIG. 8 is a block diagram conceptually illustrating an exemplary eNodeB and an exemplary UE configured in accordance with an aspect of the present disclosure.

FIG. 8 is a block diagram conceptually illustrating an exemplary base station 810 and an exemplary UE 850 configured in accordance with an aspect of the present disclosure. For example, the base station 810 and the UE 850, as shown in FIG. 8, may be an example of the eNodeB 14 and of the UE 12 in FIG. 1, respectively. The UE 850 may include a modem component 40. The base station 810 may be equipped with antennas $834_{1-t}$, and the UE 850 may be equipped with antennas $852_{1-r}$, wherein t and r are integers greater than or equal to one.

At the base station 810, a base station transmit processor 820 may receive data from a base station data source 812 and control information from a base station controller/processor 840. The control information may be carried on the PBCH, PCFICH, PHICH, PDCCH, etc. The data may be carried on the PDSCH, etc. The base station transmit processor 820 may process (e.g., encode and symbol map) the data and control information to obtain data symbols and control symbols, respectively. The base station transmit processor 820 may also generate reference symbols, e.g., for the PSS, SSS, and cell-specific reference signal (CRS). A base station transmit (TX) multiple-input multiple-output (MIMO) processor 830 may perform spatial processing (e.g., precoding) on the data symbols, the control symbols, and/or the reference symbols, if applicable, and may provide output symbol streams to the base station modulators/demodulators (MODs/DEMODs) $832_{1-t}$. Each base station modulator/demodulator 832 may process a respective output symbol stream (e.g., for OFDM, etc.) to obtain an output sample stream. Each base station modulator/demodulator 832 may further process (e.g., convert to analog, amplify, filter, and upconvert) the output sample stream to obtain a downlink signal. Downlink signals from modulators/demodulators $832_{1-t}$ may be transmitted via the antennas $834_{1-t}$ respectively.

At the UE 850, the UE antennas $852_{1-r}$ may receive the downlink signals from the base station 810 and may provide received signals to the UE modulators/demodulators (MODs/DEMODs) $854_{1-r}$, respectively. Each UE modulator/demodulator 854 may condition (e.g., filter, amplify, downconvert, and digitize) a respective received signal to obtain input samples. Each UE modulator/demodulator 854 may further process the input samples (e.g., for OFDM, etc.) to obtain received symbols. A UE MIMO detector 856 may obtain received symbols from all the UE modulators/demodulators $854_{1-r}$, and perform MIMO detection on the received symbols if applicable, and provide detected symbols. A UE reception processor 858 may process (e.g., demodulate, deinterleave, and decode) the detected symbols, provide decoded data for the UE 850 to a UE data sink 860, and provide decoded control information to a UE controller/processor 880.

On the uplink, at the UE 850, a UE transmit processor 864 may receive and process data (e.g., for the PUSCH) from a UE data source 862 and control information (e.g., for the PUCCH) from the UE controller/processor 880. The UE transmit processor 864 may also generate reference symbols for a reference signal. The symbols from the UE transmit processor 864 may be precoded by a UE TX MIMO processor 866 if applicable, further processed by the UE modulator/demodulators $854_{1-r}$ (e.g., for SC-FDM, etc.), and transmitted to the base station 810. At the base station 810, the uplink signals from the UE 850 may be received by the base station antennas 834, processed by the base station modulators/demodulators 832, detected by a base station MIMO detector 836 if applicable, and further processed by a base station reception processor 838 to obtain decoded data and control information sent by the UE 850. The base station reception processor 838 may provide the decoded data to a base station data sink 846 and the decoded control information to the base station controller/processor 840.

The base station controller/processor 840 and the UE controller/processor 880 may direct the operation at the base station 810 and the UE 850, respectively. The base station controller/processor 840 and/or other processors and modules at the base station 810 may perform or direct, e.g., the execution of various processes for the techniques described herein. For example, the controller/processor 880 may implement the modem component 40 (FIG. 1). The UE controller/processor 880 and/or other processors and modules at the UE 850 may also perform or direct, e.g., the physical layer procedures, measurements, event reporting, RLF detection, and/or other processes for the techniques described herein. The base station memory 842 and the UE memory 882 may store data and program codes for the base station 810 and the UE 850, respectively. A scheduler 844 may schedule UEs 850 for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or base station. In the alternative, the processor and the storage medium may reside as discrete components in a user terminal or base station.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for performing control plane measurements in a wireless device, comprising:
    performing, on radio-frequency signals received via a radio-frequency transceiver over an unlicensed spectrum across multiple sub-frames, radio resource management (RRM) measurements of a cell, wherein performing the RRM measurements includes measuring reference signal received power (RSRP) with the radio-frequency transceiver to obtain RSRP measurements associated with a first subset of the sub-frames including opportunistic transmissions and RSRP measurements associated with a second subset of the sub-frames including guaranteed transmissions;
    identifying a first subset of the RRM measurements associated with the first subset of the sub-frames and a second subset of the RRM measurements associated with the second subset of the sub-frames; and
    determining one or more RRM measurement values based on both of the first subset of the RRM measurements and the second subset of the RRM measurements, wherein determining one of the RRM measurement values includes combining, into a single RSRP value, the RSRP measurements associated with the first subset of the sub-frames and the RSRP measurements associated with the second subset of the sub-frames;
    comparing the one or more RRM measurement values to a threshold value or an RRM measurement value for another cell to detect an RRM event; and
    reporting the RRM event to the cell.

2. The method of claim 1, wherein:
    performing the RRM measurements includes measuring a first received signal strength indicator (RSSI) associated with the first subset of the sub-frames and a second RSSI associated with the second subset of the sub-frames, and
    determining the one or more RRM measurement values includes determining a first reference signal received quality (RSRQ) value for the first subset of the sub-frames based on the first RSSI and determining a second RSRQ value for the second subset of the sub-frames based on the second RSSI.

3. The method of claim 2, wherein the comparing the one or more RRM measurement values comprises comparing the first RSRQ value to a threshold value to detect the RRM event.

4. The method of claim 2, wherein the comparing the one or more RRM measurement values comprises comparing the second RSRQ value to a received signal quality for a reference signal for a different cell to detect the RRM event.

5. The method of claim 2, further comprising receiving, from a network, an indication of which of the first RSRQ value and the second RSRQ value to use by the wireless device.

6. An apparatus for performing control plane measurements in a wireless device, comprising:
    a radio-frequency transceiver configured to receive radio-frequency signals over an unlicensed spectrum across multiple sub-frames;
    a memory; and
    a processor communicatively coupled to the radio-frequency transceiver and the memory, the processor and the memory configured to:
    perform, on the radio-frequency signals received over the unlicensed spectrum across the multiple sub-frames, radio resource management (RRM) measurements of a cell;
    identify a first subset of the RRM measurements associated with a first subset of the sub-frames including opportunistic transmissions and a second subset of the RRM measurements associated with a second subset of the sub-frames including guaranteed transmissions;
    determine one or more RRM measurement values based on both the first subset of the RRM measurements and the second subset of the RRM measurements;
    measure reference signal received power (RSRP) with the radio-frequency transceiver to obtain RSRP measurements associated with the first subset of the sub-frames and RSRP measurements associated with the second subset of the sub-frames; and
    determine one of the RRM measurement values by combining, into a single RSRP value, the RSRP measurements associated with the first subset of the sub-frames and the RSRP measurements associated with the second subset of the sub-frames
    compare the one or more RRM measurement values to a threshold value or an RRM measurement value for another cell to detect an RRM event; and
    report the RRM event to the cell.

7. The apparatus of claim 6, wherein the processor and the memory are configured to:
    measure a first received signal strength indicator (RSSI) associated with the first subset of the sub-frames and a second RSSI associated with the second subset of the sub-frames; and
    determine a first reference signal received quality (RSRQ) value for the first subset of the sub-frames based on the first RSSI and a second RSRQ value for the second subset of the sub-frames based on the second RSSI.

8. The apparatus of claim 7, wherein the processor and the memory are configured to compare the first RSRQ value to a threshold value to detect the RRM event.

9. The apparatus of claim 7, wherein the processor and the memory are configured to compare the second RSRQ value to a received signal quality for a reference signal for a different cell to detect the RRM event.

10. The apparatus of claim 7, wherein the processor and the memory are configured to receive, from a network, via the transceiver, an indication of which of the first RSRQ value and the second RSRQ value to use by the wireless device.

11. An apparatus for performing control plane measurements in a wireless device, comprising:
    means for performing, on radio-frequency signals received via a radio-frequency transceiver over an unlicensed spectrum across multiple sub-frames, radio resource management (RRM) measurements of a cell;

means for identifying a first subset of the RRM measurements associated with a first subset of the sub-frames including opportunistic transmissions and a second subset of the RRM measurements associated with a second subset of the sub-frames including guaranteed transmissions; and means for determining one or more RRM measurement values based on both of the first subset of the RRM measurements and the second subset of the RRM measurements, wherein:

the means for performing RRM measurements are further for measuring reference signal received power (RSRP) with a radio-frequency transceiver to obtain RSRP measurements associated with the first subset of the sub-frames and RSRP measurements associated with the second subset of the sub-frames, and the means for determining the one or more measurement values are further for determining one of the RRM measurements by combining, into a single RSRP value, the RSRP measurements associated with the first subset of the sub-frames and the RSRP measurements associated with the second subset of the sub-frames;

means for comparing the one or more RRM measurement values to a threshold value or an RRM measurement value for another cell to detect an RRM event; and means for reporting the RRM event to the cell.

12. The apparatus of claim 11, wherein:

the means for performing RRM measurements are further for measuring a first received signal strength indicator (RSSI) associated with the first subset of the sub-frames and a second RSSI associated with the second subset of the sub-frames, and the means for determining are further for determining a first reference signal received quality (RSRQ) value for the first subset of the sub-frames based on the first RSSI and a second RSRQ value for the second subset of the sub-frames based on the second RSSI.

13. The apparatus of claim 12, wherein the means for comparing is configured to compare the first RSRQ value to a threshold value to detect the RRM event.

14. The apparatus of claim 12, wherein the means for comparing is configured to compare the second RSRQ value to a received signal quality for a reference signal for a different cell to detect the RRM event.

15. The apparatus of claim 12, further comprising means for receiving, from a network, an indication of which of the first RSRQ value and the second RSRQ value to use by the wireless device.

16. A non-transitory computer-readable medium storing computer executable code for execution by a processor for performing control plane measurements in a wireless device, comprising:

code for performing, on radio-frequency signals received via a radio-frequency transceiver over an unlicensed spectrum across multiple sub-frames, radio resource management (RRM) measurements of a cell, wherein the code for performing the RRM measurements includes code for measuring reference signal received power (RSRP) with the radio-frequency transceiver to obtain RSRP measurements associated with a first subset of the sub-frames including opportunistic transmissions and RSRP measurements associated with a second subset of the sub-frames including guaranteed transmissions;

code for identifying a first subset of the RRM measurements associated with the first subset of the sub-frames and a second subset of the RRM measurements associated with the second subset of the sub-frames; and code for determining one or more RRM measurement values based on both of the first subset of the RRM measurements and the second subset of the RRM measurements, wherein the code for determining one of the RRM measurement values includes code for combining, into a single RSRP value, the RSRP measurements associated with the first subset of the sub-frames and the RSRP measurements associated with the second subset of the sub-frames;

code for comparing the one or more RRM measurement values to a threshold value or an RRM measurement value for another cell to detect an RRM event; and code for reporting the RRM event to the cell.

* * * * *